US012112455B2

(12) United States Patent
Bui et al.

(10) Patent No.: US 12,112,455 B2
(45) Date of Patent: Oct. 8, 2024

(54) FACE-AWARE OFFSET CALCULATION MODULE AND METHOD FOR FACIAL FRAME INTERPOLATION AND ENHANCEMENT AND A FACE VIDEO DEBLURRING SYSTEM AND METHOD USING THE SAME

(71) Applicant: Vinai Artificial Intelligence Application and Research Joint Stock Company, Ha Noi (VN)

(72) Inventors: Hung Hai Bui, Ha Noi (VN); Hoai Minh Nguyen, Ha Noi (VN); Phong The Tran, Ha Noi (VN); Anh Tuan Tran, Ha Noi (VN); Thao Phuong Nguyen Thi, Ha Noi (VN)

(73) Assignee: VINAI AI APPLICATION AND RESEARCH JOINT STOCK CO., Ha Noi (VN)

( * ) Notice: Subject to any disclaimer, the term of this patent is extended or adjusted under 35 U.S.C. 154(b) by 327 days.

(21) Appl. No.: 17/202,731

(22) Filed: Mar. 16, 2021

(65) Prior Publication Data
US 2022/0067886 A1    Mar. 3, 2022

(30) Foreign Application Priority Data
Sep. 1, 2020  (VN) .............. 1-2020-05043

(51) Int. Cl.
*G06T 5/70*   (2024.01)
*G06F 18/25*  (2023.01)
*G06T 5/50*   (2006.01)
*G06V 10/44*  (2022.01)
*G06V 40/16*  (2022.01)

(52) U.S. Cl.
CPC .............. *G06T 5/70* (2024.01); *G06F 18/253* (2023.01); *G06T 5/50* (2013.01); *G06V 10/44* (2022.01); *G06V 40/169* (2022.01)

(58) Field of Classification Search
CPC .......... G06T 5/002; G06T 5/50; G06T 5/003; G06T 2207/10016; G06T 2207/30201; G06F 18/253; G06V 10/44; G06V 10/454; G06V 10/82; G06V 40/169; G06V 40/161
See application file for complete search history.

(56) References Cited

U.S. PATENT DOCUMENTS

2020/0342209 A1\* 10/2020 Li ........................ G06N 3/082
2022/0075991 A1\* 3/2022 Liang ................ H04N 23/611

OTHER PUBLICATIONS

"Deokyun Kim et al., Progressive Face Super-Resolution via Attention to Facial Landmark, Ccomputer Vision and Pattern Recognition, Cornell University, 2019" (Year: 2019).\*

(Continued)

*Primary Examiner* — Andrew M Moyer
*Assistant Examiner* — Phuong Hau Cai
(74) *Attorney, Agent, or Firm* — United One Law Group LLC; Kongsik Kim; Jhongwoo Peck

(57) ABSTRACT

Provided is a Face-aware Offset Calculation (FOC) module and method for facial frame interpolation and enhancement and a face video deblurring system and method using the same. The system comprises: a facial frame enhancement device, including a FOC module, for enhancing a target frame; a facial frame interpolation device, including the FOC module, for interpolating the target frame; and a combination device for combining the enhanced target frame with the interpolated target frame.

36 Claims, 10 Drawing Sheets

(56) References Cited

OTHER PUBLICATIONS

"Xiaoyu Xiang et al., Zooming Slow-Mo: Fast and Accurate One-Stage Space-Time Video Super-Resolution, 2020 IEEE/CVF Conference on Computer Vision and Pattern Recognition (CVPR), Jun. 2020" (Year: 2020).*

"Andres G. Marrugo et al., Retinal Image Restoration by Means of Blind Deconvolution, Journal of Biomedical Optics, vol. 16, Issue 11, 116016, Nov. 2011" (Year: 2011).*

"Jiaqiang Zhang et al., Learning Deformable Hourglass Networks (DHGN) for Unconstrained Face Alignment, Sep. 2019, 2019 IEEE International Conference on Image Processing, Taipei, Taiwan" (Year: 2019).*

"Mingjie He. et al., Deformable Face Net: Learning Pose Invariant Feature with Pose Aware Feature Alignment for Face Recognition, Jul. 2019, 2019 14th IEEE International Conference on Automatic Face and Gesture Recognition" (Year: 2019).*

* cited by examiner

FACE-AWARE OFFSET CALCULATION MODULE AND METHOD FOR FACIAL FRAME INTERPOLATION AND ENHANCEMENT AND A FACE VIDEO DEBLURRING SYSTEM AND METHOD USING THE SAME

CROSS-REFERENCE TO REPLATED APPLICATION

This application claims priority to Vietnamese Patent Application No. 1-2020-05043 filed on Sep. 1, 2020, which application is incorporated herein by reference in its entirety.

BACKGROUND

1. Technical Field

The present invention relates to a Face-aware Offset Calculation (FOC) module and method for facial frame interpolation and enhancement and a face video deblurring system and method using the same.

2. Related Art

In general, many face videos include blurry frames due to amateur use of handheld cameras or rapid movement of highly animated faces.

Blurry faces are uncomfortable to see and lead to failure in many facial analysis algorithms. Accordingly, there is a high demand for face deblurring in many application fields.

In particular, deblurring is an important research topic and is widely being researched in signal processing and computer vision. According to a recent high-tech method based on deep learning, a convolutional neural network (CNN) is trained using the temporal redundancy between neighboring frames to enhance a blurry frame. In a processing pipeline of such a method, an important step is alignment, in which neighboring frames may be warped to align with a target frame. However, when the target frame is very blurry, alignment may be difficult, and inaccurate alignment may lead to poor deblurring results.

SUMMARY

According to the first aspect of the present invention, there is provided a Face-aware Offset Calculation (FOC) method, the method comprises receiving features and landmark heatmaps of a set of frames; and generating an offset map based on the received features and landmark heatmaps.

According the second aspect of the present invention, there is provided a facial frame enhancement method, the method comprises extracting feature maps from input frames containing a target frame; aligning each of the extracted feature maps to the feature map of the target frame based on an offset map generated by using FOC method of the first aspect; fusing the aligned feature maps, including the feature map of the target frame, to estimate a feature map of an enhanced target frame; and reconstructing the enhanced target frame by using the feature map thereof.

In an embodiment, the input frames include five consecutive frames.

In an embodiment, the aligning comprises obtaining alignment offsets from each of neighboring frames to the target frame with FOC method; and aligning, by a deformable convolution layer, each of extracted feature maps of the neighboring frames to the feature map of the target frame using the generated offset map.

In an embodiment, the aligning is a pyramid, cascading, and deformable (PCD) aligning using FOC for offset calculation.

In an embodiment, a single level aligning in PCD aligning comprises using, at each non-bottom level, the feature maps and landmark heatmaps of the downsampled images to calculate the deformable convolution kernels; refining, at the bottom level, the deformable convolution kernels by fusing them with the upsampled offset estimation from the previous level; and convolving the deformable kernels with the feature map of the neighboring frame.

In an embodiment, the number of levels is three.

In an embodiment, for each non-top level, a simplified FOC method using features of frames as input is used.

According the third aspect of the present invention, there is provided a facial frame interpolation method, the method comprises extracting feature maps from input frames where a target frame is missing; interpolating, from each set of extracted feature maps, a feature map of the target frame based on an offset map generated by using FOC method of the first aspect; fusing the interpolated feature maps to estimate a combined feature map of the interpolated target frame; and reconstructing the interpolated target frame by using the combined feature map thereof.

In an embodiment, the input frames include four frames.

In an embodiment, the interpolating comprises using each set of three neighboring frames from the input frames for FOC method; and converting, by a deformable convolution layer, the feature map of center frame in each set to the feature map of target frame using the generated offset map.

In an embodiment, the interpolating comprises forward interpolating and backward interpolating.

In an embodiment, the interpolating is a pyramid, cascading, and deformable (PCD) interpolating using FOC for offset calculation.

In an embodiment, a single level interpolating in PCD interpolating comprises using, at each non-bottom level, the feature maps and landmark heatmaps of the downsampled images to calculate the deformable convolution kernels; refining, at the bottom level, the deformable convolution kernels by fusing them with the upsampled offset estimation from the previous level; and convolving the deformable kernels with the feature map of the neighboring frames.

In an embodiment, the number of levels is three.

In an embodiment, for each non-top level, a simplified FOC method using features of frames as input is used.

According the forth aspect of the present invention, there is provided a face video deblurring method, the method comprises enhancing a target frame using the method of the second aspect; interpolating the target frame using the method of the third aspect; and combining the enhanced target frame with the interpolated target frame.

In an embodiment, the face video deblurring method further comprises pre-processing for removing noise and deblurring not-too-blurry target frame in advance.

According the fifth aspect of the present invention, there is provided a Face-aware Offset Calculation (FOC) module, the FOC module is configured to receive features and landmark heatmaps of a set of frames; and generate an offset map based on the received features and landmark heatmaps.

According the sixth aspect of the present invention, there is provided a facial frame enhancement device, the device comprises an extraction module for extracting feature maps from input frames containing a target frame; an alignment module, including the FOC module of the fifth aspect, for aligning each of the extracted feature maps to the feature map of the target frame based on an offset map generated by the FOC module; a fusion module for fusing the aligned feature maps, including the feature map of the target frame, to estimate a feature map of an enhanced target frame; and a reconstruction module for reconstructing the enhanced target frame by using the feature map thereof.

In an embodiment, the alignment module is configured to obtain alignment offsets from each of neighboring frames to the target frame with FOC module; and align, by a deformable convolution layer, each of extracted feature maps of the neighboring frames to the feature map of the target frame using the generated offset map.

In an embodiment, the alignment module has a pyramid, cascading, and deformable (PCD) architecture using FOC module for offset calculation.

In an embodiment, a single level alignment module in PCD architecture is configured to use, at each non-bottom level, the feature maps and landmark heatmaps of the downsampled images to calculate the deformable convolution kernels; refine, at the bottom level, the deformable convolution kernels by fusing them with the upsampled offset estimation from the previous level; and convolve the deformable kernels with the feature map of the neighboring frame.

In an embodiment, wherein for each non-top level, a simplified FOC module using features of frames as input is used.

According the seventh aspect of the present invention, there is provided a facial frame interpolation device, the device comprises an extraction module for extracting feature maps from input frames where a target frame is missing; an interpolation module, including the FOC module of the fifth aspect, for interpolating, from each set of extracted feature maps, a feature map of the target frame based on an offset map generated by the FOC module; a fusion module for fusing the interpolated feature maps to estimate a combined feature map of the interpolated target frame; and a reconstruction module for reconstructing the interpolated target frame by using the combined feature map thereof.

In an embodiment, the interpolation module is configured to use each set of three neighboring frames from the input frames for FOC module; and convert, by a deformable convolution layer, the feature map of center frame in each set to the feature map of target frame using the generated offset map.

In an embodiment, the interpolation module is configured to perform forward interpolating and backward interpolating.

In an embodiment, the interpolation module has a pyramid, cascading, and deformable (PCD) architecture using FOC module for offset calculation.

In an embodiment, a single level interpolation module in PCD architecture is configured to use, at each non-bottom level, the feature maps and landmark heatmaps of the downsampled images to calculate the deformable convolution kernels; refine, at the bottom level, the deformable convolution kernels by fusing them with the upsampled offset estimation from the previous level; and convolve the deformable kernels with the feature map of the neighboring frames.

In an embodiment, for each non-top level, a simplified FOC module using features of frames as input is used.

According the eighth aspect of the present invention, there is provided a face video deblurring system, the system comprises the facial frame enhancement device of the sixth aspect for enhancing a target frame; the facial frame interpolation device of the seventh aspect for interpolating the target frame; and a combination device for combining the enhanced target frame with the interpolated target frame.

In an embodiment, the face video deblurring system further comprises a pre-processing device for removing noise and deblurring not-too-blurry target frame in advance.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Figure 1:
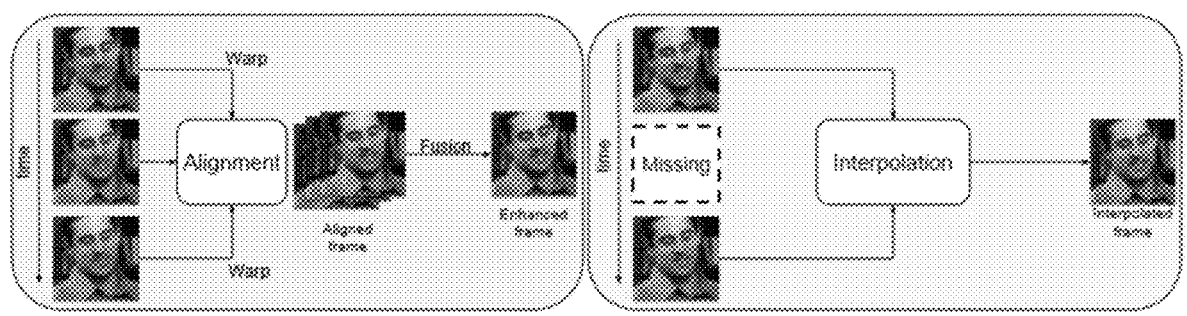
FIG. 1 is a diagram illustrating enhancement and interpolation for tackling deblurring according to prior art.

Although a variety of modifications and several embodiments of the present invention may be made, exemplary embodiments will be shown in the drawings and described. However, it should be understood that the present invention is not limited to the exemplary embodiments and includes all changes, equivalents, or substitutions within the concept and technical scope of the present invention.

The terms including ordinal numbers, such as second and first, may be used for describing a variety of elements, but the elements are not limited by the terms. The terms are used only for distinguishing one element from another element. For example, without departing from the scope of the present invention, a second element may be referred to as a first element, and similarly, a first element may be referred to as a second element. The term "and/or" includes any combination of a plurality of associated listed items or any one of the plurality of associated listed items.

When it is stated that one element is "connected" or "joined" to another element, it should be understood that the element may be directly connected or joined to the other element but another element may be present therebetween. On the other hand, when it is stated that one element is "directly connected" or "directly joined" to another element, it should be understood that no other element is present therebetween.

Terms used herein are used only for describing exemplary embodiments and are not intended to limit the present invention. Singular expressions include plural expressions unless clearly defined otherwise in context. Throughout this specification, it should be understood that the terms "include," "have," etc. are used herein to specify the presence of stated features, numbers, steps, operations, elements, parts, or combinations thereof but do not preclude the presence or addition of one or more other features, numbers, steps, operations, elements, parts, or combinations thereof.

Unless defined otherwise, terms used herein including technical or scientific terms have the same meanings as terms which are generally understood by those of ordinary skill in the art. Terms such as those defined in commonly used dictionaries should be construed as having meanings equal to contextual meanings of related art and should not be interpreted in an idealized or excessively formal sense unless clearly defined so herein.

Hereinafter, embodiments of the present invention will be described in detail with reference to the accompanying drawings. Throughout the drawings, like reference numerals will be given to the same or corresponding elements, and a repeated description thereof will be omitted.

Figure 2:
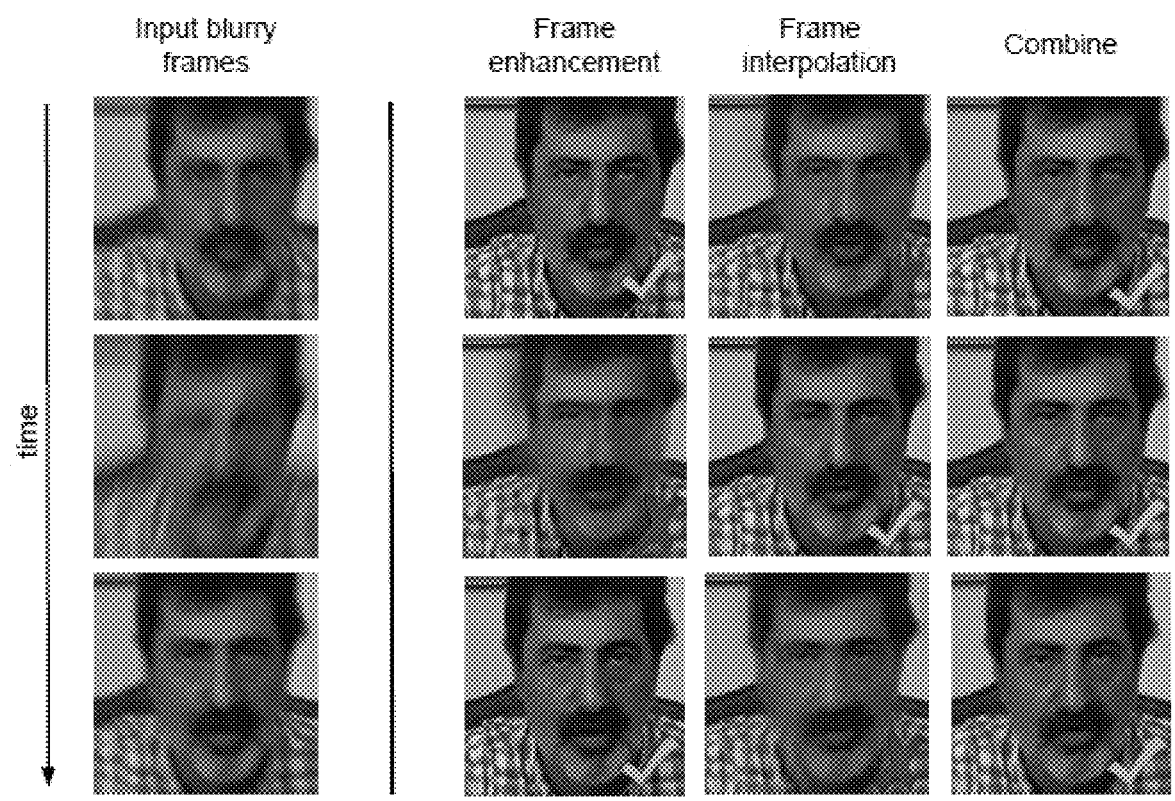
FIG. 2 is a set of pictures illustrating pros and cons of enhancement and interpolation approaches.
Figure 3:
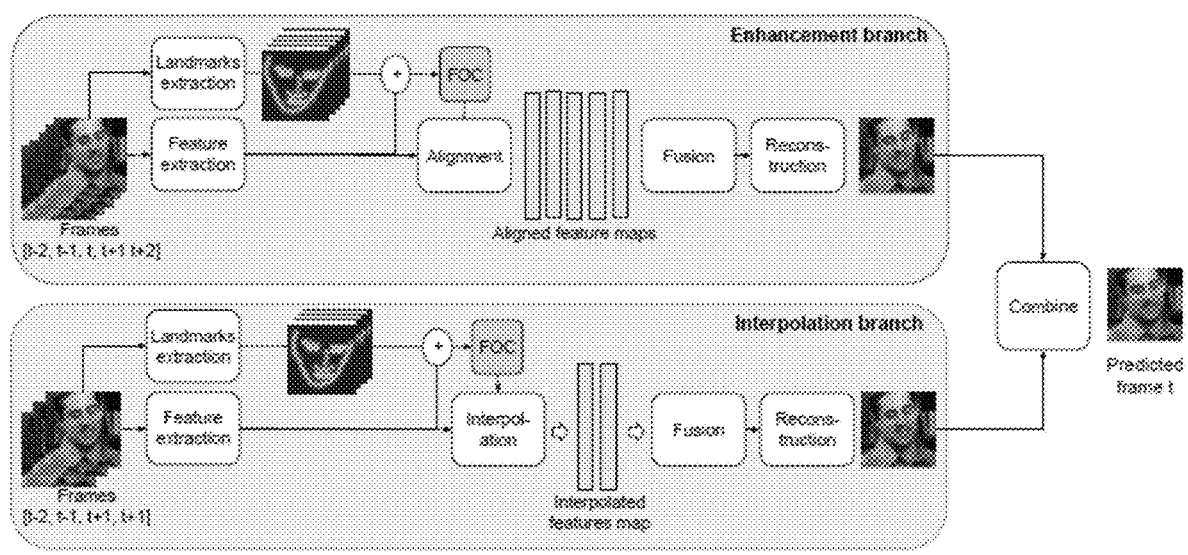
FIG. 3 is a diagram showing an architecture of a facial frame interpolation and enhancement method for face video deblurring according to an exemplary embodiment of the present invention.
Figure 4:
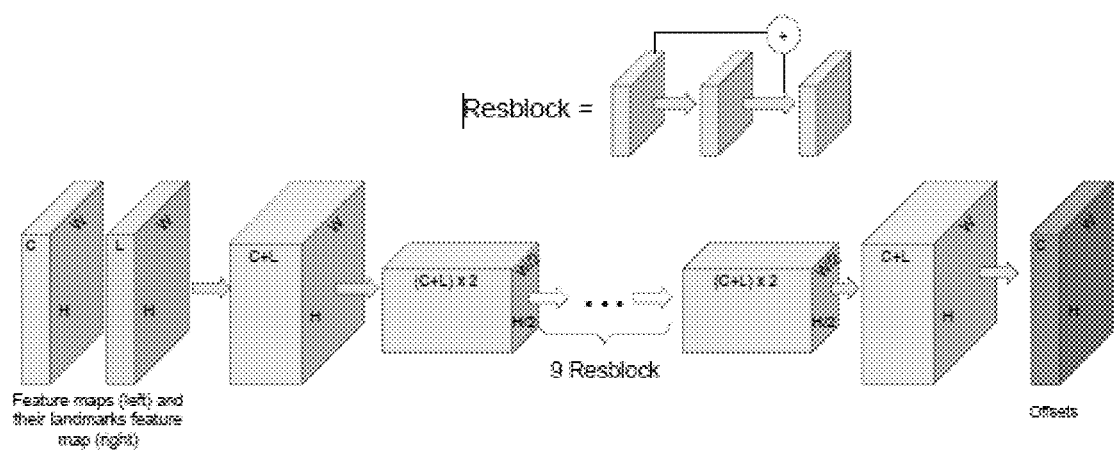
FIG. 4 is a diagram showing an architecture of face-aware offset calculation (FOC) in the facial frame interpolation and enhancement method for face video deblurring according to the exemplary embodiment of the present invention.
Figure 5:
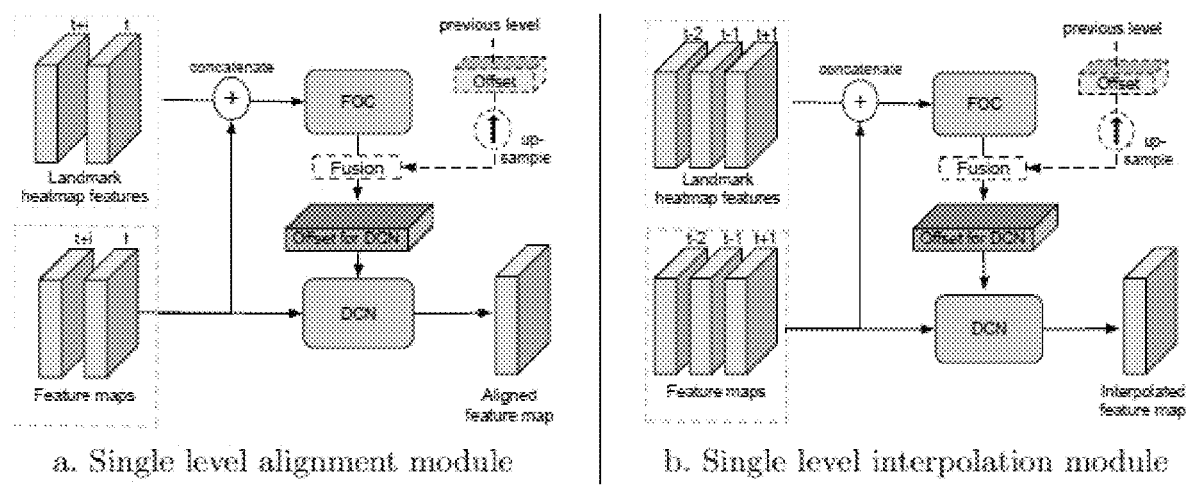
FIG. 5 is a set of diagrams showing architectures of single level alignment and interpolation modules.
Figure 6:
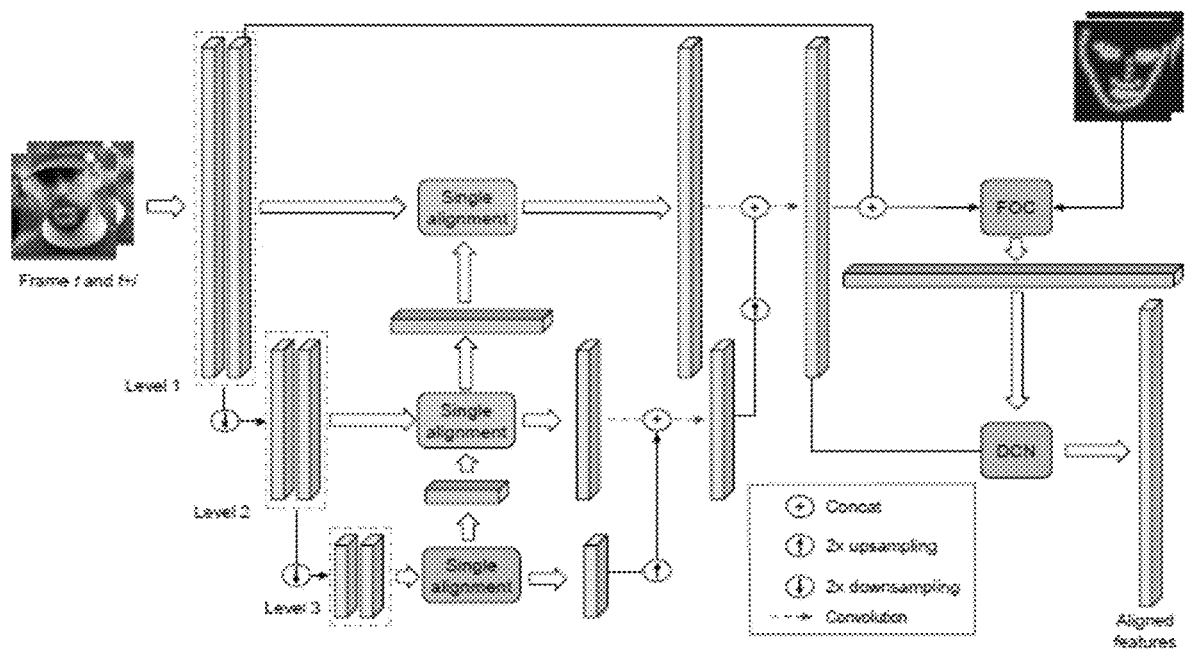
FIG. 6 is a diagram showing a pyramid and cascading structure of an enhancement branch.
Figure 7:
FIG. 7 shows deblurring results on two examples from VoxCeleb dataset (top) and 300VW (bottom) (where only peak signal-to-noise ratios (PSNRs) of output images relative to ground truth images are shown)
Figure 8:
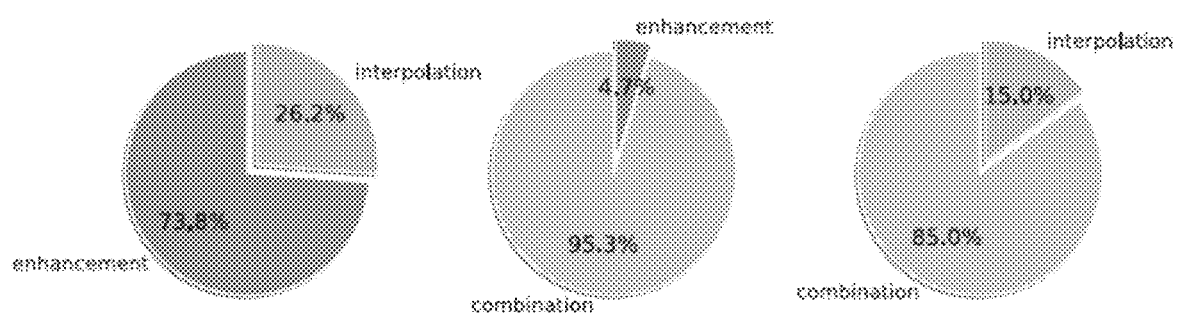
FIG. 8 is a set of diagrams showing pairwise comparisons between an enhancement branch, an interpolation branch, and a combination thereof (where for each method pair, the pie plot reports the success rate of one method over the other, and the statistics are based on PSNR scores of deblurred 300VW test data)
Figure 9:
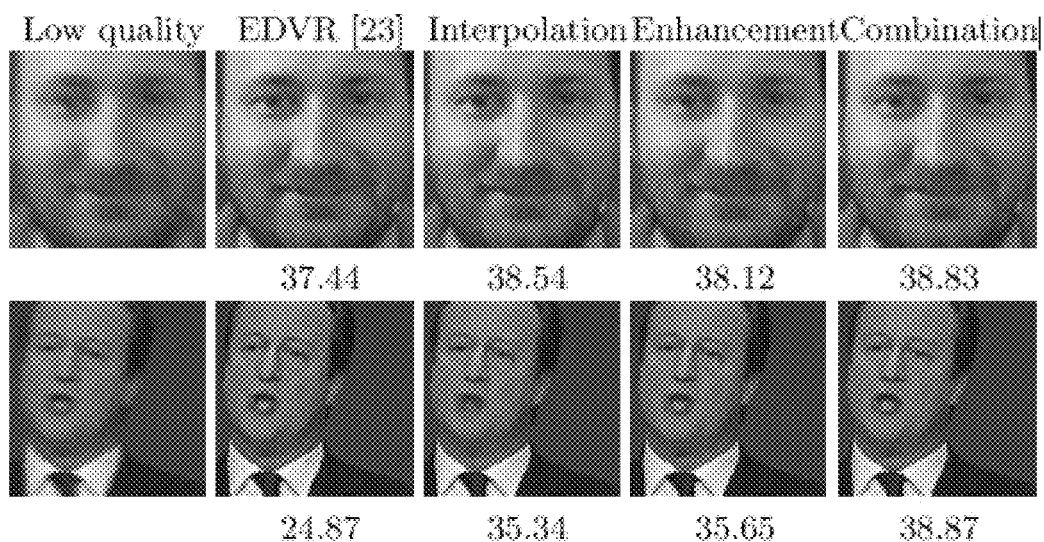
FIG. 9 shows results of each module on two examples in a 300VW test set (PSNRs may be used to evaluate the quality of images)
Figure 10:
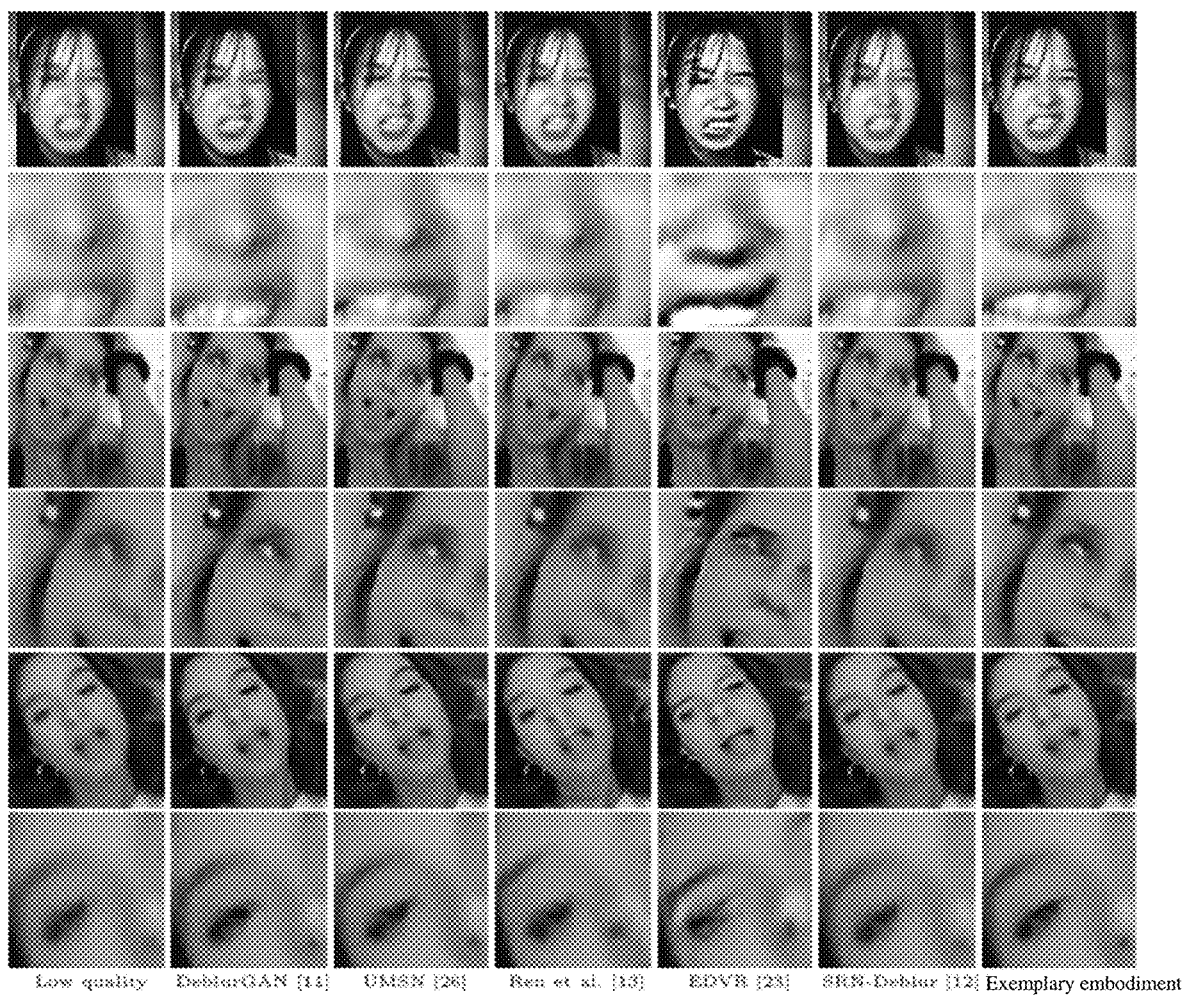
FIG. 10 shows qualitative results on real blurry videos.

FIG. 1 is a diagram illustrating enhancement and interpolation for tackling deblurring. FIG. 2 is a set of pictures illustrating pros and cons of enhancement and interpolation approaches. FIG. 3 is a diagram showing an architecture of a facial frame interpolation and enhancement method for face video deblurring according to an exemplary embodiment of the present invention. FIG. 4 is a diagram showing an architecture of face-aware offset calculation (FOC) in the facial frame interpolation and enhancement method for face video deblurring according to the exemplary embodiment of the present invention. FIG. 5 is a set of diagrams showing architectures of single level alignment and interpolation modules. FIG. 6 is a diagram showing a pyramid and cascading structure of an enhancement branch. FIG. 7 shows deblurring results on two examples from VoxCeleb dataset (top) and 300VW (bottom) (where only peak signal-to-noise ratios (PSNRs) of output images relative to ground truth images are shown). FIG. 8 is a set of diagrams showing pairwise comparisons between an enhancement branch, an interpolation branch, and a combination thereof (where for each method pair, the pie plot reports the success rate of one method over the other, and the statistics are based on PSNR scores of deblurred 300VW test data). FIG. 9 shows results of each module on two examples in a 300VW test set (PSNRs may be used to evaluate the quality of images). FIG. 10 shows qualitative results on real blurry videos.

The facial frame interpolation and enhancement method for face video deblurring according to the exemplary embodiment of the present invention includes an operation of interpolating and enhancing a frame and an operation of combining the interpolated frame and the enhanced frame together.

Referring to FIG. 1, in the facial frame interpolation and enhancement method for face video deblurring according to the exemplary embodiment of the present invention, an enhancement approach employs a blurry frame as an alignment target. In an interpolation approach, a blurry frame is treated as a missing frame and estimated through interpolating from neighboring frames. The enhancement approach has advantages over the interpolation approach when the target frame is of high quality, and thus it is easier to enhance the target frame than to generate the target frame from scratch.

The facial frame interpolation and enhancement method for face video deblurring according to the exemplary embodiment of the present invention can improve the quality of a deblurred output video by combining the enhancement approach and the interpolation approach.

Referring to FIG. 2, checkmarks indicate high quality images, and crosses indicate low quality images. On the second input frame which is blurrier, interpolation may be performed better than enhancement. On the other hand, enhancement is better for less blurry frames. Accordingly, the facial frame interpolation and enhancement method for face video deblurring according to the exemplary embodiment of the present invention can provide advantages of both the interpolation approach and the enhancement approach to provide an improved quality video.

Also, the facial frame interpolation and enhancement method for face video deblurring according to the exemplary embodiment of the present invention may further include FOC for frame alignment and interpolation.

FOC may be described as an FOC method or module below.

FOC may be performed by using facial landmarks as a prior to find correspondences and calculate position offsets between image frames. The facial landmarks may be obtained by running a facial landmark detector.

According to the exemplary embodiment, it is possible to estimate position offsets for deformable convolution kernels using landmark heatmaps instead of defining explicit constraints on the basis of estimated landmarks. This approach can rectify the inaccuracy of detected facial landmarks and improve the quality of final deblurring outputs.

Also, the facial frame interpolation and enhancement method for face video deblurring according to the exemplary embodiment of the present invention can provide a clear and sharp image even from a video on the Internet which is actually blurred due to camera shaking or rapid movement.

The facial frame interpolation and enhancement method for face video deblurring according to the exemplary embodiment of the present invention extracts and uses temporal information for video deblurring through facial frame interpolation and enhancement.

According to the exemplary embodiment of the present invention, the temporal information is used in facial frame interpolation.

Facial Image Enhancement

First, when the distribution of the test data differs from that of training data, the performance of a deblurring method may be degraded. To avoid this problem, many domain-specific methods have been developed, and face is an important domain of interest.

Also, a method of parsing a blurry face into four parts and separately deblurring each part before combining the results or a method of concatenating face semantic labels with face images may be difficult to apply to a blurry face.

Unlike this, the exemplary embodiment of the present invention can readily work with blurry faces. In other words, deblurring which employs a face prior cannot process severe blur, whereas the exemplary embodiment of the present invention employs facial landmarks to learn the dynamic kernels of deformable convolution layers. In this way, it is possible to solve the problem of facial landmark detection.

Facial Frame Interpolation

Temporal video interpolation is studied in the field of computer vision. First, bidirectional optical flows are estimated from two neighboring frames. However, optical flow estimation from a blurry frame may be very inaccurate. In this case, an alternative approach to facial frame interpolation, which employs a deformable convolution network instead of optical flow, may be used. In other words, instead of using a pre-trained network for interpolation, it is possible to learn and optimize an interpolation network for face video deblurring.

Deformable Convolution Network

A deformable convolution network (DCN) performs a convolution operator at a position deformable with a position offset which is specified by an additional network branch instead of using a convolution kernel.

Also, a DCN is extended by introducing an additional learnable modulation scalar Δm to improve the performance of deformable convolution operation.

In the facial frame interpolation and enhancement method for face video deblurring, deformable convolution may be used for alignment. In other words, deformation convolution may be used in both of enhancement and interpolation.

A deformable convolution network will be briefly described below.

When a feature map F is given, a feature at a position p in a next layer F'(p) may be obtained by a convolution layer with a kernel of 3×3 size as follows: (see Equation 1)

$$F'(p) = \sum_{k=1}^{9} w_k * F(p + p_k).$$ [Equation 1]

Here, $p_k \in \{(-1, -1), (-1, 0), \ldots\}$ and $w_k$ are weights of a position $p_k$ in the kernel. Unlike a normal convolution network, a modulated DCN has two learnable offsets $\Delta p_k$ and modulation scalars $\Delta m_k$. Now, a feature at position p in the next layer F'(p) is given by Equation 2 below.

$$F'(p) = \sum_{k=1}^{9} w_k * F(p + p_k + \Delta p_k) * \Delta m_k.$$ [Equation 2]

Facial Landmark Detection

A landmark detection method can produce accurate facial key points even from blurry images. Such a method is a convolutional neural network (CNN)-based heatmap regression model. According to such a method, landmark positions are not directly estimated, instead, the heatmap of each key point is regressed and then used to generate the positions of landmarks. In the exemplary embodiment of the present invention, an intermediate heatmap may be used.

The facial frame interpolation and enhancement method for face video deblurring according to the exemplary embodiment of the present invention proposes a cyclic model that can both improve deblurring and landmarks detection tasks. The proposed model includes two branches corresponding to the above-described two tasks. An output of the first branch is used as an input of the second branch.

Outputs of the second branch are sequentially used as previous inputs of the first branch. Accordingly, two tasks are mutually improved. A landmark detection branch works better when the input is clear, whereas a deblurring branch works better when a prior landmark is accurate. However, the process of this model is overly time-consuming.

According to another exemplary embodiment of the present invention, the facial frame interpolation and enhancement method for face video deblurring includes two stages.

In the first stage, noise is removed, and frames which are not too blurry are deblurred. Then, in the second stage, the full model is applied.

Facial Frame Interpolation And Enhancement Network

In the facial frame interpolation and enhancement method for face video deblurring according to the exemplary embodiment of the present invention, there are two branches: enhancement and interpolation, as shown in FIG. 3. The enhancement branch and the interpolation branch will be described below as an enhancement method and an interpolation method.

According to the exemplary embodiment of the present invention, the operation of interpolating and enhancing the frame includes an operation of extracting a landmark and a feature, an operation of calculating a face-aware offset by using the landmark and the feature, and an operation of generating a target frame by estimating a feature map from the calculated face-aware offset. The landmark and feature may be extracted from neighboring frames.

Specifically, at the enhancement branch, with the assistance of a warped frame by aligning neighboring frames with the target frame, each blurry frame is directly enhanced.

In the interpolation branch, a blurry frame is treated as a missing frame and is estimated from neighboring frames. Output images from the enhancement branch and the interpolation branch are fused together to produce a final output.

To improve both the enhancement branch and the interpolation branch, facial landmarks are used to calculate a position offset for a deformable convolution kernel.

FOC will be described below which is a novel method or module for taking a target frame, neighboring frames, and corresponding facial landmark heatmaps to estimate alignment offsets. FOC is used in both the enhancement branch and the interpolation branch. FOC will be described below, followed by a description of the enhancement and interpolation branches.

Face-Aware Offset Calculation (FOC)

Face-aware offset estimation is an important operation in DCN-based feature alignment but is overlooked in existing deblurring tasks.

According to the exemplary embodiment of the present invention, both the approaches may use only two convolution layers for offset estimation. Accordingly, FOC may be performed.

According to the exemplary embodiment of the present invention, the operation of calculating a face-aware offset by using the landmark heatmap and the feature may include an operation of receiving a feature and a landmark heatmap of a neighboring frame and operation of concatenating the received feature and landmark heatmap together and putting them into FOC to get the offset.

The operation of generating the target frame by estimating the feature map through the calculated face-aware offset may include an operation of converting the target feature map into the target frame.

First, in FOC, features and landmark heatmaps of several neighboring frames may be used as inputs. The features and the landmark heatmaps may be extracted from the neighboring frames. Additionally, in the enhancement branch (or in the operation of performing enhancement), extraction is made from blurry frames as shown in FIG. 3. On the other hand, in the interpolation branch (or in the operation of performing interpolation), blurry frames are excluded, and thus extraction is made, excluding the blurry frames.

An output of FOC is an offset map for alignment or interpolation.

More specifically, assuming that there is a set of frames $F=\{f_0, f_1, \ldots, f_k\}$, landmark heatmaps $H=\{h_0, h_1, \ldots, h_k\}$ may be generated. Each landmark heatmap includes L (=68) channels, each of which corresponds to a key point.

Then, a feature extraction method or module may be used to convert features into feature maps $H^1=\{h^1_0, h^1_1, \ldots, h^1_k\}$.

Finally, $\{f_0, f_1, \ldots, f_k\}$ and $\{h^1_0, h^1_1, \ldots, h^1_k\}$ may be concatenated together and put into FOC to output an offset.

In the enhancement branch, FOC takes one neighboring frame and the target frame as inputs. A deformable convolution layer may use the estimated offset value to align the neighboring feature map with a target feature map.

In the interpolation branch, FOC takes three input frames [t−2, t−1, t+1] or [t+2, t+1, t−1]. A deformable convolution layer may use the calculated offset value to convert the center frame of the input set into a target frame t (FOC is illustrated in FIG. 4).

Enhancement Branch

To refine a blurry frame t, the enhancement branch may use information of five consecutive frames t−2, t−1, t, t+1, and t+2. This branch has four processing operations: feature extraction, alignment, fusion, and reconstruction. Each frame after downsampling goes through a feature extraction module so that a feature map may be generated. The feature maps of all frames are aligned with the feature map of a frame t using an alignment module.

The alignment module may be an extension of a pyramid, cascading, and deformable (PCD) alignment module with FOC module.

According to the exemplary embodiment of the present invention, all aligned feature maps including the feature map of the target frame t are combined by a fusion module to estimate the feature map of an enhanced target frame. In the final operation, an estimated target frame may be generated from the feature map by reconstruction.

Although the alignment module is developed on the basis of PCD alignment according to the exemplary embodiment, the alignment module may be improved by using an FOC module to calculate position offsets for the deformable convolution kernels. This extension is a method which outperforms existing high-tech deblurring methods.

According to the exemplary embodiment of the present invention, to align frame t+i with frame t, offsets may be calculated, and features may be aligned at several scales from coarse to fine. For each scale level, feature maps and landmark heatmaps of downsampled images are used to calculate the deformable convolution kernels. Except for the bottom level of FOC, the kernels will be refined by fusing with upsampled offsets which are estimated from the previous level.

Finally, the deformable kernels are convolved with the feature map of frame t+i (FIG. 5A shows such an alignment procedure).

As shown in FIG. 6, a pyramid and cascading structure is used for alignment. A pyramid of feature maps is calculated for each frame.

The first level of the pyramid is a feature map extracted by a feature extraction module. From the second level, the feature map of the pyramid is calculated directly from the previous level by a stride convolutional operation. The number of levels used in the exemplary embodiments is three. The top level is indexed as level 1, and the bottom level is level 3. To align frame t'=t+i with frame t, levels in the pyramid structure of frame t' are aligned with levels in the pyramid of frame t, respectively.

At each non-leaf level 1-1, aligned features are concatenated with the corresponding upsampled features of level 1, and followed by a convolutional layer. As for offset calculation, the convolutional layer may be replaced by FOC.

Here, $F^1_t$ and $F^1_{t'}$ are the feature maps of frame t and frame t' at level 1, a desired aligned feature is $A^1_{t'}$, and the map of position offsets is $\Delta P^1_{t'}$.

Also, the landmark heatmaps of frame t and frame t' are $h_t$ and $h_{t'}$. $A^1_{t'}$ and $\Delta P^1_{t'}$ are calculated as follows:

$$\Delta P_{t'}^3 = FOC(F_{t'}^3, F_t^3),$$

$$A_{t'}^3 = DConv(F_{t'}^3, \Delta P_{t'}^3),$$

$$\Delta P_{t'}^2 = FOC(Conv(F_{t'}^2 \oplus \Delta F_{t'}^2), (F_t^3)^{\uparrow 2}),$$

$$A_{t'}^2 = Conv(DConv(F_{t'}^2, \Delta P_{t'}^2) \oplus (A_{t'}^3)^{\uparrow 2}),$$

$$\Delta P_{t'}^1 = FOC(Conv(F_{t'}^1 \oplus F_t^1), (F_{t'}^2)^{\uparrow 2}, h_{t'}, h_t),$$

$$A_{t'}^1 = Conv(DConv(F_{t'}^1, \Delta P_{t'}^1) \oplus (A_{t'}^2)^{\uparrow 2}),$$

where $\oplus$ and $\uparrow$ are concatenation and upsampling operations.

Only a facial landmark heatmap may be used in FOC of level 0. To align the feature map of each non-top level, simplified FOC with a small encoder-decoder network which does not use landmark prior may be used to save computational cost.

Interpolation Branch

The interpolation branch may use deformable convolution with a feature pyramid and cascading architecture. The "missing" frame is interpolated from $I_{t-2}$, $I_{t-1}$, $I_{t+1}$, $I_{t+2}$ and corresponding landmark heatmaps $h_{t-2}$, $h_{t-1}$, $h_{t+1}$, and $h_{t+2}$ thereof.

The exemplary embodiment of the present invention uses both forward and backward interpolations, which are denoted by $I^{\rightarrow}_t$ and $I^{\leftarrow}_t$, respectively. Forward and backward interpolations may be combined as follows.

First, $I^{\rightarrow}_t$ may be calculated by applying an interpolation module to three frames $[I_{t-2}, I_{t-1}, I_{t+1}]$ and landmark heatmaps thereof.

Second, $I^{\leftarrow}_t$ may be calculated by applying the interpolation module to three frames $[I_{t+2}, I_{t+1}, I_{t-1}]$ and landmark heatmaps thereof (in decreasing order of frames).

Finally, $I^{\rightarrow}_t$ and $I^{\leftarrow}_t$ are combined by the fusion module, and the missing frame may be estimated using the combined feature map (FIG. 5B shows a forward interpolation procedure).

For forward and backward interpolation, three neighboring frames may be used instead of four. In ablation studies described in the following experimental examples, there is no benefit of using four frames over three. Therefore, three frames may be used to reduce computational cost.

The facial frame interpolation method according to the exemplary embodiment of the present invention is designed exclusively for deblurring. This method may be easily transferred into a similar application of video slow-motion interpolation.

Combining Enhanced Frame and Interpolated Frame

The output images of the enhancement branch and the interpolation branch may be combined using a simple network module. A combination module has a simple architecture including two downsampling layers, nine ResNet blocks, and two upsampling layers.

Early fusion is another approach to fuse the results of the enhancement branch and the interpolation branch. There is an approach for fusing intermediate feature maps, five from the enhancement branch and two from the interpolation branch, instead of fusing final output images.

Training Loss $L_1$ loss between an estimated frame and ground truth may be used in both the interpolation branch and the enhancement branch. Also, the sharpness of a reconstructed face is enhanced using spatial gradient loss. Gradient maps with respect to coordinates x and y are designated as $G_x$ and $G_y$, respectively. Training losses of the enhancement branch and the interpolation branch are as follows.

$$\mathcal{L}_{in}=\|I^{gt}-I^{in}\|_1+\|G_x(I^{gt})-G_x(I^{in})\|_1+\|G_y(I^{gt})-G_y(I^{in})\|_1,$$

$$\mathcal{L}_{en}=\|I^{gt}-I^{en}\|_1+\|G_x(I^{gt})-G_y(I^{en})\|_1+\|G_y(I^{gt})-G_y(I^{en})\|_1,$$

where $I^{en}$ and $I^{in}$ are image outputs of the enhancement branch and the interpolation branch, and $I^{gt}$ is a ground truth frame.

After the enhancement branch and the interpolation branch are trained, the combination module is trained to combine $I^{en}$ and $I^{in}$. For the combination module, only $L_1$ loss may be used for training (e.g., $\mathcal{L}_{combine}=\|I^{gt}-\hat{I}\|_1$, where $\hat{I}$ is a final output of a deblurring $\mathcal{L}$ network).

Experiments

Implementation Details

The network was trained with a mini-batch size of 12 images. The Adam optimizer was used with $\beta_0=0.9$ and $\beta_1=0.999$. An initial learning rate was 104, and the training converged after about 200,000 iterations.

A two-stage strategy was used. In the first stage, a small deblurring module was used to remove noise and partially deblur the video. In the second stage, very blurry frames were handled. This strategy improved the performance of the alignment and interpolation modules.

Datasets for Training and Evaluation

To train a framework and compare it with other methods, commonly used datasets VoxCeleb and 300VW may be used. To further verify the system in a real scenario, the system was tested with collected blurry YouTube datasets.

The VoxCeleb dataset is a large dataset of face video clips collected from YouTube with about 146K training videos and 6K test videos.

Due to the large size, 1300 videos were randomly selected from among training videos of about 700K frames to create a training set. A random blur kernel was used to generate training data in the experiments. Also, 130 videos were selected from the from the testing set of VoxCeleb for evaluation.

To evaluate the generalization ability of a trained model with a new domain, 30 videos of the 300VW dataset were added to the test data.

The method was not only evaluated with synthetically blurred images but also tested with 100 low-quality face videos from YouTube including blurry frames. Qualitative experimental results show that the exemplary embodiment of the present invention provides clearer deblurring results than other methods.

Comparison with High-Tech Methods

In the exemplary embodiment, PSNR and structural similarity (SSIM) are used as evaluation metrics.

TABLE 1

| Method | VoxCeleb PSNR | VoxCeleb SSIM | 300VW PSNR | 300VW SSIM |
|---|---|---|---|---|
| Kupyn et al. [11] | 26.45 | 0.4418 | 26.83 | 0.6228 |
| Yasarla et al. [26] | 31.08 | 0.9035 | 31.35 | 0.9538 |

TABLE 1-continued

| Method | VoxCeleb PSNR | VoxCeleb SSIM | 300VW PSNR | 300VW SSIM |
|---|---|---|---|---|
| Ren et al. [13] | 32.26 | 0.9089 | 33.05 | 0.9278 |
| Liu et al. [12] | 34.71 | 0.9342 | 34.15 | 0.9501 |
| Wang et al. [23] | 34.77 | 0.8409 | 29.12 | 0.8775 |
| exemplary embodiment | 37.04 | 0.9612 | 38.22 | 0.9700 |

The average PSNR and SSIM values of all methods for the test data of VoxCeleb and 300VW datasets are shown in Table 1.

More specifically, the exemplary embodiment of the present invention achieved a PSNR of 37.04 in the VoxCeleb dataset, whereas the PSNR of the second-best method was only 34.77. The performance gap between the exemplary embodiment and the second-best method was much wider for the 300VW test set.

Also, the exemplary embodiment generates high-quality output with sharp boundaries between facial components even in an adverse condition as shown in FIG. 7.

Table 2 below shows benefits of FOC and landmark inputs on both the enhancement and interpolation branches. The numbers are reported in the 300VW dataset.

TABLE 2

| Used In Enhancement Branch? | | | | Used in Interpolation Branch? | | | |
|---|---|---|---|---|---|---|---|
| FOC | Landmarks | PSNR | SSIM | FOC | Landmarks | PSNR | SSIM |
| x | x | 29.12 | 0.8775 | x | x | 35.49 | 0.9490 |
| ✓ | x | 37.37 | 0.9590 | ✓ | x | 36.36 | 0.9598 |
| ✓ | ✓ | 37.81 | 0.9649 | ✓ | ✓ | 36.87 | 0.9638 |

Table 2 reports the results of the experiments on the importance of having the FOC modules for computing the location offsets for deformable convolution kernels. Note that FOC modules are proposed to use in both the enhancement and interpolation branches. As can be observed, there is a clear benefit of using FOC modules; the PSNR drops sharply if FOC is not used in the enhancement branch. The landmark heatmaps are also useful, for both enhancement and interpolation branches. Using the landmark heatmaps of two frames, FOC can predict the face movement and produce accurate offsets for deformable convolution. Note that landmark heatmaps are only used as an implicit prior for calculating the location offsets for the deformable kernels. This approach is very robust to the failure of the landmark detector, unlike the methods that explicitly use face structure priors.

The exemplary embodiment may avoid limitations of the above-described two branches. In FIG. 9, the first row is a case in which outputs of the interpolation branch are better than those of the enhancement branch, whereas in the second row, the interpolation branch fails to generate sharp facial components. The combination of the two branches may yield the best results in the both cases. As shown in the second and third plots of FIG. 8, the combination method outperforms enhancement and interpolation for 95.3% and 85.0% of time, respectively.

Table 3 below shows benefits of enhancement-interpolation fusion. The numbers are reported in the 300VW dataset.

TABLE 3

| Enhancement | Interpolation | Late fusion | PSNR | SSIM |
|---|---|---|---|---|
| ✓ | x | | 37.81 | 0.9649 |
| x | ✓ | | 36.87 | 0.9633 |
| ✓ | ✓ | x | 37.88 | 0.9655 |
| ✓ | ✓ | ✓ | 38.22 | 0.9700 |

To verify the fusion scheme, the performance of the early fusion approach is reported in the third row of Table 3. Unlike the late fusion, this method provides only a minor gain. It can be explained by the fact that the number of feature maps from the enhancement branch dominates the number of interpolated maps, making early fusion inefficient.

According to the exemplary embodiment, in the case of the interpolation module, an experiment was carried out on both forward and backward interpolation with four frames. However, there is no significant difference in performance when three or four frames are used. The PSNR/SSIM of the two methods are 36.83/0.9632 and 36.87/0.9633, respectively.

Evaluation on Real Blurry Videos

Finally, to validate the generalization ability and the practical usefulness of the deblurring model, the deblurring model was run together with other high-tech methods on real low-quality YouTube videos. The results are shown in FIG. 10.

The videos contain real blur caused by camera shaking, rapid face movement, or both. A user study was conducted in which 46 users were asked to select the best deblurred image from among results of the exemplary embodiment and other high-tech methods for 23 test cases. The method according to the exemplary embodiment was selected as the best method by 91.3% of the 23 test cases.

It is possible to easily see that facial components, such as the eyes or the nose, generated by the exemplary embodiment are clearer than those generated by other models.

The exemplary embodiment has two parallel network branches for facial frame enhancement and facial frame interpolation. Also, a novel method (or module) for calculating spatial offsets between two facial feature maps by using facial landmark heatmaps has been introduced. Experiments on a number of real and synthetically generated blurry frames demonstrate excellent performance of the method.

According to an exemplary embodiment of the present invention, it is possible to implement a facial frame interpolation and enhancement method for face video deblurring by which the quality of final results is improved.

According to an exemplary embodiment of the present invention, it is possible to implement a facial frame interpolation and enhancement method for face video deblurring which provides improved quantitative and qualitative results of a blurry video data.

Various advantages and effects of the present invention are not limited to those described above and may be easily understood in the detailed description of embodiments of the present invention.

The term "unit" used in the exemplary embodiment of the present invention means software or a hardware component, such as a field-programmable gate array (FPGA) or application-specific integrated circuit (ASIC), and a "unit" performs a specific role. However, a "unit" is not limited to software or hardware. A "unit" may be configured to be present in an addressable storage medium and also may be configured to run one or more processors. Therefore, as an example, a "unit" includes elements, such as software elements, object-oriented software elements, class elements, and task elements, processes, functions, attributes, procedures, subroutines, segments of program code, drivers, firmware, microcode, circuits, data, a database, data structures, tables, arrays, and variables. Elements and functions provided in "units" may be coupled to a smaller number of elements and "units" or may be subdivided into a greater number of elements and "units." In addition, elements and "units" may be implemented to run one or more central processing units (CPUs) in a device or a secure multimedia card.

All or at least some of elements of the above-described device may be implemented in the form of a hardware module, a software module, or a combination of the hardware module and the software module. The software module may be understood as, for example, an instruction executed by a processor for controlling computation in the device, and the instruction may have a form installed in a memory in the device.

A device and method according to exemplary embodiments of the present invention may be implemented in the form of a program instruction that can be performed through various computing means and may be recorded in a computer-readable recording medium. The computer-readable recording medium may include a program instruction, a data file, a data structure, etc. separately or in combination. The program instruction recorded in the medium may be specially designed and constructed for the present invention or may be well known to and used by those of ordinary skill in the art of computer software. Examples of the computer-readable recording medium include magnetic media such as a hard disk, a floppy disk, and a magnetic tape, optical media such as a compact disc (CD)-read only memory (ROM) and a digital versatile disc (DVD), magneto-optical media such as a floptical disk, and hardware devices, such as a ROM, a random access memory (RAM), and a flash memory, specially configured to store and execute a program instruction. Examples of the program instruction include not only machine language code generated by a compiler but also high-level language code executable by a computer through an interpreter and the like. The aforementioned hardware device may be configured to operate as one or more software modules in order to perform an operation of the present invention, and vice versa.

Although the present invention has been described above with exemplary embodiments, those of ordinary skill in the art should understand that various modifications and changes can be made from the above description without departing from the spirit and scope of the present invention as defined in the following claims.

What is claimed is:

1. A Face-aware Offset Calculation (FOC) method, the method comprising: receiving feature maps and landmark heatmaps of a set of frames; performing a vector concatenation of the feature maps and the landmark heatmaps together to generate inputs, wherein the vector concatenation joins the feature maps and the landmark heatmaps end-to-end by concatenating a vector of the feature maps and a vector of the landmark heatmaps together end-to-end to form a concatenated new vector including elements of the vector of the feature maps and the vector of the landmark heatmaps; and generating an offset map by performing a regression analysis on the inputs, wherein the offset map represents a map of 2D offset vectors that indicate magnitudes by which convolution kernel's sampling locations are to be deformed at each pixel to transform a feature from one frame to another in a deformable convolution network (DCN), and wherein the offset map is configured to be used by the DCN to align and/or interpolate a facial feature map.

2. A facial frame enhancement method, the method comprising:
   extracting feature maps from input frames containing a target frame;
   aligning each of the extracted feature maps to the feature map of the target frame based on the offset map generated by using the FOC method according to claim 1;
   fusing the aligned feature maps, including the feature map of the target frame, to estimate a feature map of an enhanced target frame; and
   reconstructing the enhanced target frame by using the feature map thereof.

3. The facial frame enhancement method according to claim 2, wherein the input frames include five consecutive frames.

4. The facial frame enhancement method according to claim 2, wherein the aligning comprising:
   obtaining alignment offsets from each of neighboring frames to the target frame with the FOC method; and
   aligning, by a deformable convolution layer, each of extracted feature maps of the neighboring frames to the feature map of the target frame using the generated offset map.

5. The facial frame enhancement method according to claim 2, wherein the aligning is a pyramid, cascading, and deformable (PCD) aligning using the FOC method for offset calculation.

6. The facial frame enhancement method according to claim 5, wherein a single level aligning in PCD aligning comprising:
   using, at each non-bottom level, the feature maps and landmark heatmaps of the downsampled images to calculate the deformable convolution kernels;
   refining, at the bottom level, the deformable convolution kernels by fusing them with the upsampled offset estimation from the previous level; and
   convolving the deformable kernels with the feature map of the neighboring frame.

7. The facial frame enhancement method according to claim 5, wherein the number of levels is three.

8. The facial frame enhancement method according to claim 5, wherein for each non-top level, a simplified FOC method using features of frames as input is used.

9. A facial frame interpolation method, the method comprising:
   extracting feature maps from input frames where a target frame is missing;
   interpolating, from each set of extracted feature maps, a feature map of the target frame based on the offset map generated by using the FOC method according to claim 1;
   fusing the interpolated feature maps to estimate a combined feature map of the interpolated target frame; and
   reconstructing the interpolated target frame by using the combined feature map thereof.

10. The facial frame interpolation method according to claim 9, wherein the input frames include four frames.

11. The facial frame interpolation method according to claim 9, wherein the interpolating comprises:
   using each set of three neighboring frames from the input frames for the FOC method; and
   converting, by a deformable convolution layer, the feature map of center frame in each set to the feature map of target frame using the generated offset map.

12. The facial frame interpolation method according to claim 9, wherein the interpolating comprises forward interpolating and backward interpolating.

13. The facial frame interpolation method according to claim 9, wherein the interpolating is a pyramid, cascading, and deformable (PCD) interpolating using the FOC method for offset calculation.

14. The facial frame interpolation method according to claim 13, wherein a single level interpolating in PCD interpolating comprises:
   using, at each non-bottom level, the feature maps and landmark heatmaps of the downsampled images to calculate the deformable convolution kernels;
   refining, at the bottom level, the deformable convolution kernels by fusing them with the upsampled offset estimation from the previous level; and
   convolving the deformable kernels with the feature map of the neighboring frames.

15. The facial frame interpolation method according to claim 13, wherein the number of levels is three.

16. The facial frame interpolation method according to claim 13, wherein for each non-top level, a simplified FOC method using features of frames as input is used.

17. A face video deblurring method, the method comprising:
   extracting feature maps from input frames containing a target frame;
   aligning each of the extracted feature maps to the feature map of the target frame based on an offset map generated by using the FOC method according to claim 1;
   fusing the aligned feature maps, including the feature map of the target frame, to estimate a feature map of an enhanced target frame;
   reconstructing the enhanced target frame by using the feature map thereof;
   extracting feature maps from input frames where a target frame is missing;
   interpolating, from each set of extracted feature maps, a feature map of the target frame based on an offset map generated by using the FOC method;
   fusing the interpolated feature maps to estimate a combined feature map of the interpolated target frame;
   reconstructing the interpolated target frame by using the combined feature map thereof; and
   combining the enhanced target frame with the interpolated target frame.

18. The face video deblurring method of claim 17, further comprising pre-processing for removing noise and deblurring some target frames in advance.

19. A non-transitory computer-readable medium containing program instructions, which comprises a Face-aware Offset Calculation (FOC) module, executed by a processor or controller, the FOC module of the program instructions when executed by the processor or controller configured to: receive feature maps and landmark heatmaps of a set of frames; perform a vector concatenation of the feature maps and the landmark heatmaps together to generate inputs, wherein the vector concatenation Joins the feature maps and the landmark heatmaps end-to-end by concatenating a vector of the feature maps and a vector of the landmark heatmaps together end-to-end to form a concatenated new vector including elements of the vector of the feature maps and the vector of the landmark heatmaps; and generate an offset map by performing a regression analysis on the inputs, wherein the offset map represents a map of 2D offset vectors that indicate magnitudes by which convolution kernel's sampling locations are to be deformed at each pixel to transform a feature from one frame to another in a deformable convolution network (DCN), and wherein the offset map is configured to be used by the DCN to align and/or interpolate a facial feature map.

20. A facial frame enhancement device, the device comprising: an extraction module for extracting feature maps from input frames containing a target frame; an alignment module, including the non-transitory computer-readable medium comprised FOC module of claim 19, for aligning each of the extracted feature maps to the feature map of the target frame based on the offset map generated by the non-transitory computer-readable medium comprised FOC module; a fusion module for fusing the aligned feature maps, including the feature map of the target frame, to estimate a feature map of an enhanced target frame; and a reconstruction module for reconstructing the enhanced target frame by using the feature map thereof.

21. The facial frame enhancement device according to claim 20, wherein the input frames include five consecutive frames.

22. The facial frame enhancement device according to claim 20, wherein the alignment module is configured to:
obtain alignment offsets from each of neighboring frames to the target frame with the non-transitory computer-readable medium comprised FOC module; and
align, by a deformable convolution layer, each of extracted feature maps of the neighboring frames to the feature map of the target frame using the generated offset map.

23. The facial frame enhancement device according to claim 20, wherein the alignment module has a pyramid, cascading, and deformable (PCD) architecture using the non-transitory computer-readable medium comprised FOC module for offset calculation.

24. The facial frame enhancement device according to claim 23, wherein a single level alignment module in PCD architecture is configured to:
use, at each non-bottom level, the feature maps and landmark heatmaps of the downsampled images to calculate the deformable convolution kernels;
refine, at the bottom level, the deformable convolution kernels by fusing them with the upsampled offset estimation from the previous level; and
convolve the deformable kernels with the feature map of the neighboring frame.

25. The facial frame enhancement device according to claim 23, wherein the number of levels is three.

26. The facial frame enhancement device according to claim 23, wherein for each non-top level, a simplified FOC module using features of frames as input is used.

27. A face video deblurring system, the system comprising:
an extraction module for extracting feature maps from input frames containing a target frame;
an alignment module, including the non-transitory computer-readable medium comprised FOC module of claim 19, for aligning each of the extracted feature maps to the feature map of the target frame based on an offset map generated by the non-transitory computer-readable medium comprised FOC module;
a fusion module for fusing the aligned feature maps, including the feature map of the target frame, to estimate a feature map of an enhanced target frame;
a reconstruction module for reconstructing the enhanced target frame by using the feature map thereof an extraction module for extracting feature maps from input frames where a target frame is missing;
an interpolation module, including the non-transitory computer-readable medium comprised FOC module, for interpolating, from each set of extracted feature maps, a feature map of the target frame based on an offset map generated by the non-transitory computer-readable medium comprised FOC module;
a fusion module for fusing the interpolated feature maps to estimate a combined feature map of the interpolated target frame;
a second reconstruction module for reconstructing the interpolated target frame by using the combined feature map thereof;
and a combination device for combining the enhanced target frame with the interpolated target frame.

28. The face video deblurring system of claim 27, further comprising a pre-processing device for removing noise and deblurring some target frames in advance.

29. A facial frame interpolation device, the device comprising:
an extraction module for extracting feature maps from input frames where a target frame is missing;
an interpolation module, including the non-transitory computer-readable medium comprised FOC module according to claim 19, for interpolating, from each set of extracted feature maps, a feature map of the target frame based on the offset map generated by the non-transitory computer-readable medium comprised FOC module;
a fusion module for fusing the interpolated feature maps to estimate a combined feature map of the interpolated target frame; and a reconstruction module for reconstructing the interpolated target frame by using the combined feature map thereof.

30. The facial frame interpolation device according to claim 29, wherein the input frames include four frames.

31. The facial frame interpolation device according to claim 29, wherein the interpolation module is configured to:
use each setofthreeneghboringframesfromtheinputframesforthenon-transitory computer-readable medium comprised FOC module; and
convert, by a deformable convolution layer, the feature map of center frame in each set to the feature map of target frame using the generated offset map.

32. The facial frame interpolation device according to claim 29, wherein the interpolation module is configured to perform forward interpolating and backward interpolating.

33. The facial frame interpolation device according to claim 29, wherein the interpolation module has a pyramid, cascading, and deformable (PCD) architecture using the FOC module for offset calculation.

34. The facial frame interpolation device according to claim 33, wherein a single level interpolation module in PCD architecture is configured to:
use, at each non-bottom level, the feature maps and landmark heatmaps of the downsampled images to calculate the deformable convolution kernels;
refine, at the bottom level, the deformable convolution kernels by fusing them with the upsampled offset estimation from the previous level; and
convolve the deformable kernels with the feature map of the neighboring frames.

35. The facial frame interpolation device according to claim 33, wherein the number of levels is three.

36. The facial frame interpolation device according to claim 33, wherein for each non-top level, a simplified FOC module using features of frames as input is used.

\* \* \* \* \*